(12) United States Patent
Jiang

(10) Patent No.: US 11,051,385 B2
(45) Date of Patent: Jun. 29, 2021

(54) ETHERNET LIGHTING CONTROL SYSTEM AND METHOD FOR STAGE LIGHTS

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 16/830,757

(22) Filed: Mar. 26, 2020

(65) Prior Publication Data

US 2020/0229291 A1    Jul. 16, 2020

Related U.S. Application Data

(63) Continuation of application No. PCT/CN2018/102575, filed on Aug. 27, 2018.

(30) Foreign Application Priority Data

Sep. 29, 2017   (CN) .......................... 201710907854.1

(51) Int. Cl.
*H05B 47/18* (2020.01)
*H05B 47/29* (2020.01)
*H04L 12/10* (2006.01)

(52) U.S. Cl.
CPC ............. *H05B 47/18* (2020.01); *H04L 12/10* (2013.01); *H05B 47/29* (2020.01)

(58) Field of Classification Search
CPC ...... H05B 47/18; H05B 47/29; H05B 47/235; H04L 12/10

(Continued)

(56) References Cited

U.S. PATENT DOCUMENTS

2009/0316836 A1* 12/2009 Wang .................... G06F 13/426
375/340
2010/0026187 A1*  2/2010 Kelly ......................... F21S 4/28
315/113

(Continued)

FOREIGN PATENT DOCUMENTS

CN         101699923 A      4/2010
CN         101990333 A      3/2011

(Continued)

OTHER PUBLICATIONS

International Search Report for CN Application No. PCT/CN2018/102575, dated Dec. 3, 2018, 4 pages.

(Continued)

*Primary Examiner* — Don P Le
(74) *Attorney, Agent, or Firm* — Lerner, David, Littenberg, Krumholz & Mentlik, LLP

(57) ABSTRACT

An Ethernet lighting control system comprises an ARTNET console and several rows of stage lights, wherein each row of stage lights comprises several stage lights successively connected in series, each stage light being internally provided with a network switching unit. The ARTNET console is connected to a network switching unit of a first stage light in each row of stage lights, by means of a network cable respectively; adjacent stage lights in each row of stage lights are connected in sequence by means of a network cable; a network control signal sent by the ARTNET console is delivered to the network switching unit of the first stage light; and the network switching unit of the preceding stage light receives and delivers the network control signal to an internal circuit of the stage light for processing, and then switches to the network switching unit of the subsequent stage light.

8 Claims, 3 Drawing Sheets

(58) Field of Classification Search
USPC .......................................................... 315/90
See application file for complete search history.

(56) References Cited

U.S. PATENT DOCUMENTS

| | | | | |
|---|---|---|---|---|
| 2010/0060175 | A1* | 3/2010 | Lethellier | H05B 45/37 |
| | | | | 315/164 |
| 2012/0313529 | A1* | 12/2012 | Chen | H05B 45/50 |
| | | | | 315/121 |
| 2013/0310951 | A1* | 11/2013 | Fisher | G05B 19/052 |
| | | | | 700/2 |
| 2016/0183351 | A1* | 6/2016 | Snyder | H04L 12/2818 |
| | | | | 315/152 |
| 2016/0195911 | A1* | 7/2016 | Chapel | G06F 1/26 |
| | | | | 713/340 |
| 2019/0295457 | A1* | 9/2019 | Li | G09G 5/006 |

FOREIGN PATENT DOCUMENTS

| | | |
|---|---|---|
| CN | 102769970 A | 11/2012 |
| CN | 204993962 U | 1/2016 |
| CN | 107567147 A | 1/2018 |
| CN | 207283881 U | 4/2018 |
| DE | 102009007505 A1 | 8/2010 |
| EP | 1467465 A2 | 10/2004 |

OTHER PUBLICATIONS

Extended European Search Report including Written Opinion for EP18862758.2 dated Jun. 24, 2020; 9 pages.

* cited by examiner

ETHERNET LIGHTING CONTROL SYSTEM AND METHOD FOR STAGE LIGHTS

CROSS REFERENCE TO RELATED APPLICATIONS

The present application is a continuation of International Application No. PCT/CN2018/102575, filed on Aug. 27, 2018, which claims priority from Chinese Patent Application No. 201710907854.1 filed on Sep. 29, 2017, all of which are hereby incorporated herein by reference.

TECHNICAL FIELD

The present invention relates to the technical field of stage lights, and more particularly to an Ethernet lighting control system and method for stage lights.

BACKGROUND

With the widespread use of LEDs in stage lights, the original DMX512 wired communication used in the stage lighting industrial standard has not been able to meet the development of the industry, which mainly lies in two aspects. One is that the DMX512 has a slow transmission speed, and there is a delay for the operating of a terminal light, and the other is that the DMX512 has fewer functional channels, which is only 512, and thus cannot meet the performance needs of multiple LEDs. Therefore, the ARTNET protocol combining the Ethernet technology and stage light fixture's applications has emerged in recent years.

However, the Ethernet with quite mature technology was not originally invented for stage lighting. Because stage lighting has its special application requirements, especially the requirements for installation and use, the original Ethernet network may not be fully suitable for the requirements for stage lighting, and corresponding changes are required.

Ethernet generally has two types of wiring networks, one is a bus-type network, and the other is a star-type network. The bus-type Ethernet network is as shown in FIG. 1, which has one network cable directly connected to multiple workstations. Such configuration is less electrical cables in need, while at high management costs, difficult to isolate fault points, and in relatively slow network speed, such as generally for 10 Mbps networks. Therefore, the bus-type network is basically not used in the existing stage lights to achieve an ARTNET function. The star-type Ethernet network generally uses a dedicated network device (such as a hub or switch, collectively referred to as a HUB device) as a core node, and each light in the local area network is connected to the core node through a twisted pair. The star-type Ethernet network is as shown in FIG. 2, which has the advantages of being simple to control, easy in fault diagnosis and isolation, and convenient in service, but requires a large number of electrical cables, and has a large workload of installation and maintenance, and a heavy burden on a central node.

Stage lights are generally used in large venues, such as stadiums, opera houses, and concerts. The use of a bus-type network connection is basically the same as the original DMX512, and it is a relatively easy way to install and wire. However, its inherent problems, such as a slow transmission speed and the difficulty in fault troubleshooting, also determine that it is not suitable for the application in stage lighting. The star-type network has a fast transmission speed, which can reach 100 Mbps, and it is relatively easy to troubleshoot a fault, it however requires that each light needs a separate network cable to connect to each port of an HUB device, it thus will need more network cables, which causes high costs and inconvenient installation, if the stage lights have a relatively large distribution range.

SUMMARY

In order to overcome the existing technical defects, the present invention provides an Ethernet lighting control system and method for stage lights with fewer electrical cables, lower costs and simple control, which can be easy to troubleshoot fault points, reduce workload of installation and maintenance, and have a fast network transmission speed.

According to the present invention, the Ethernet lighting control system for stage lights comprises an ARTNET console and several rows of stage lights, wherein each row of stage lights comprises several stage lights successively connected in series; the stage light is internally provided with a network switching unit for receiving, switching and delivering network signals; the ARTNET console is connected to a network switching unit of a first stage light in each row of stage lights, by means of a network cable respectively; adjacent stage lights in each row of stage lights are connected in sequence by means of a network cable; a network control signal sent by the ARTNET console is delivered to the network switching unit of the first stage light; when the preceding stage light works normally, its network switching unit receives the network control signal and delivers same to an internal circuit of the stage light for processing and then transmits same to the network switching unit of the subsequent stage light; and when the preceding stage light has a fault, its network switching unit directly transmits the network control signal to the network switching unit of the subsequent stage light, wherein the network control signal is used for controlling the working status of the stage lights, and the internal circuit provides the required power for the stage lights.

In the present invention, the main function of the ARTNET console is to send a control signal to control the operating of each stage light, and the network cable is a main medium for implementing ARTNET communication. The ARTNET console sends a control signal to the network switching unit of the first stage light in each row of stage lights by means of a network cable, and after receiving the network control signal, the first stage light delivers the control signal to the subsequent stage light by means of a network cable between adjacent stage lights while executing a signal command, and then the network switching unit of the subsequent stage light receives the control signal, and delivers the control signal to its subsequent stage light while executing the command, and so on, so as to achieve the effect of lighting control. ARTNET is an Ethernet protocol based on a TCP/IP protocol stack. The network switching unit is mainly used for network switching. When the network switching unit detects that the stage light where it is located works normally, the network switching unit will directly transmit the received network control signal to the internal circuit of the stage light where the network switching unit is located. When the network switching unit detects that the stage light where it is located has a fault, the network switching unit will be automatically switched so that the network control signal is directly delivered to the subsequent stage light without entering into the stage light where the network switching unit is located.

Further, the network switching unit is provided in the stage light and is provided with a signal input end, a signal output end and a signal control end, wherein the signal input end of the network switching unit is connected to the preceding stage light adjacent to the stage light or the ARTNET console by means of the network cable; the signal output end thereof is connected to the internal circuit of the stage light or the network switching unit of the subsequent stage light by means of the network cable; the signal control end thereof is connected to the internal circuit of the stage light where the network switching unit is located; when the stage light works normally, the signal output end of the network switching unit thereof is in communication with the internal circuit of the stage light; and when the stage light has a fault, the signal output end of the network switching unit thereof is in communication with the signal input end of the network switching unit of the subsequent stage light.

The signal control end is connected to the internal circuit of the stage light where the network switching unit is located, so that when the internal circuit of the stage light has a fault, the signal output end of the network switching unit can be disconnected from the circuit of the stage light in a timely manner, where the network switching unit is located and the network control signal is delivered to the subsequent stage light.

Further, the network switching unit is a relay array.

The relay array is formed by combing several groups of relays. A relay is an electrical control device, which causes a predetermined step change of a controlled variable in an electrical output circuit when the change of an input variable (excitation variable) meets the specified requirements. It has an interactive relationship between a control system (also referred to as an input loop) and a controlled system (also referred to as an output loop). And it usually applied in automated control circuits. It is actually an "automatic switch" that uses a small current to control a large current operation. In the circuit, it plays the role of automatic adjustment, safety protection, circuit conversion, etc.

Further, the system also comprises a network data processing and control unit for performing data analysis and processing on the network control signal and executing the network control signal, and the network data processing and control unit is connected to the signal output end of the network switching unit.

The network data processing and control unit is used for receiving and processing network signals, and executing a network command according to network data so as to control the use of stage lights.

Further, the network data processing and control unit comprises a network data conversion chip and an MCU connected in sequence, the network data conversion chip is connected to the signal output end of the network switching unit, and the MCU is connected to the internal circuit of the stage light.

The network data conversion chip is a 3-port chip, and each port can be configured as an input port or an output port, and is mainly used for simultaneously delivering, to the MCU and an output isolation transformer, network control signals sent through an input isolation transformer. The MCU is a miniature control unit in a stage light, and is mainly used for implementing network data processing and stage light control.

Further, the system also comprises an input isolation transformer and an output isolation transformer, the input isolation transformer is provided between the signal output end of the network switching unit and the network data conversion chip, and the output isolation transformer is connected to the signal input end of the network switching unit of the subsequent stage light by means of a network cable.

The input isolation transformer and the output isolation transformer are mainly used to implement network communication and electrical isolation, so the network signals can enter the network data conversion chip, thereby preventing a transient impact in a network from damaging other circuits inside the stage light. The input isolation transformer is responsible for input isolation, and the output isolation transformer is used for output isolation.

Further, the system also comprises a voltage conversion module, which is connected to the signal control end of the network switching unit.

The main function of the voltage conversion module is to convert a single voltage into a voltage of various amplitudes for use by different functional modules of the stage light. Moreover, the voltage conversion module is connected to the signal control end of the network switching unit, and provides a voltage for the working of the network switching unit. When the voltage conversion module provides a normal voltage for the network switching unit, the network switching unit can work normally and deliver the network signal to the internal circuit of the stage light; and when the voltage provided by the voltage conversion module for the network switching unit is abnormal or there is no voltage output, the signal control end of the network switching unit will control the network signal to directly flow into the subsequent stage light without entering into the stage light where the network switching unit is located, that is, enabling the stage light where the network switching unit is located to be in a bypass state.

Further, the system also comprises a switch, a switch power supply and an alternating current power supply, the switch is respectively connected to the switch power supply and the alternating current power supply, the voltage conversion module is connected to the switch power supply, and the alternating current power supply is connected to the switch of the subsequent stage light.

The switch is mainly responsible for connecting and disconnecting a circuit, making the circuits inside the stage light work or stop working. The switch power supply is mainly responsible for converting alternating current power into direct current power for use in the working of various parts of electronic elements inside the stage light. The alternating current power supply provides alternating current power.

According to the present invention, an Ethernet lighting control method for stage lights is also provided, wherein an ARTNET console, network cables, several rows of stage lights, network switching units, an input isolation transformer, an output isolation transformer, a network data conversion chip, an MCU, a voltage conversion module and a switch are included, and the lighting control steps of the method are as follows:

S1: the ARTNET console sends a network signal and transmits same to a first stage light in each row of stage lights by means of the network cable; and S2: the first stage light in each row of stage lights switches and delivers the network signal sent by the ARTNET console by means of the network switching unit, and when the stage light where the network switching unit is located operates normally, the network switching unit will switch and deliver the network signal to the network data conversion chip, and the network data conversion chip converts the network signal into network data, then sends the network data to the MCU, while the network data conversion chip also sends the network data to the signal input end of the network switching unit of the subsequent stage light by means of the output isolation transformer; when the stage light where the network switching unit is located has a fault, the network switching unit will switch and deliver the network signal to the network switching unit of the subsequent stage light, and the network switching unit of the subsequent stage light repeatedly performs step S2 until the last stage light in each row of stage lights. In the present invention, when the stage light works normally, the network control signal sent by the ARTNET console first reaches the signal input end of the relay array of the first stage light in each row of stage lights, and since the control enabling of the relay array is decided by the output of the voltage conversion module, when an output voltage of the voltage conversion module is normal, the relay array will transmit the network control signal to the input isolation transformer, and then to the network data conversion chip, wherein the chip is a 3-port data conversion chip, which will send network data to the MCU when receiving the network data, and also transmit the network data to the output isolation transformer. After receiving the network data packet sent from the network data conversion chip, the MCU will perform analysis processing on the data and then control the operating of the stage light. The network signal sent by the network data conversion chip to the output isolation transformer will flow into a network receiving end of the subsequent stage light, and the subsequent stage light will perform a corresponding control action after receiving the data.

When the stage light has a fault, it is initially to troubleshoot the cause. Generally, there are two reasons why the stage light has a fault. One is that a power supply part has a fault, such as the switch power supply and the voltage conversion module being unable to work. If the control signal of the relay array is lost, the relay array will automatically switch the stage light where it is located to a bypass state, and the network control signal sent from the console or the preceding stage light will be automatically transmitted to the subsequent stage light. Since the MCU inside the faulty stage light has not received the control signal, the working of the faulty stage light cannot be controlled, such that the faulty stage light can be quickly detected. The other reason is due to other faults than the power supply part. For this kind of fault, site management staff can turn off the switch, so that no direct current of the faulty light is output, and the relay array is then switched to a bypass state because there is no direct current. Therefore, for the case where a stage light has a fault, the site management staff can quickly troubleshoot and isolate the faulty stage light without readjusting the wiring.

Compared with the prior art, the present invention has some beneficial effects.

According to the present invention, the disadvantage that a separate network cable must be provided from each light to the HUB device in the star-type Ethernet network is solved, which can realize the way of series connection of lights. A lot of wire materials and wiring time can be saved.

For a universal 100 Mbps network, its maximum transmission distance is 100 meters. In the present invention, the network data conversion chip and an isolation transformer are used as a relay tool, which will amplify and organize data while receiving the data, that is to say, each stage light is a network relay, making the total transmission distance farther.

When a power supply part of a certain light has a fault, it will automatically switch to a network bypass state without manual intervention. In important stage performances, the entire network link may be pulled to death if a certain light in a network link has a fault. And the whole performance will be greatly affected if the fault point on site cannot be quickly troubleshoot. With an automatic bypass circuit, the problem above can be easily solved.

Stage performers line up many different stage lights. It is possible that a certain performance does not require the participation of certain lights in the performance, and if the lights with the network bypass function proposed in the present patent are mounted, as long as the switch is turned off, the network will directly connect the stage lights that need to be controlled without passing through the turned-off stage lights.

DETAILED DESCRIPTION OF EMBODIMENTS

In order to make the object, technical solutions and advantages of the present invention clearer, the embodiments of the present invention are described in further detail below with reference to the accompanying drawings.

Figure 1:
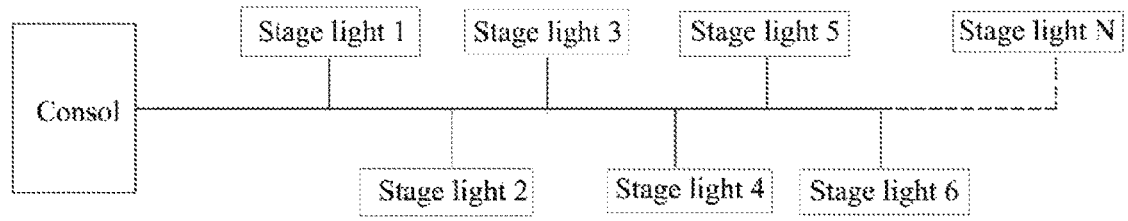
FIG. 1 is a block diagram of a bus-type Ethernet network connection in the prior art.
Figure 2:
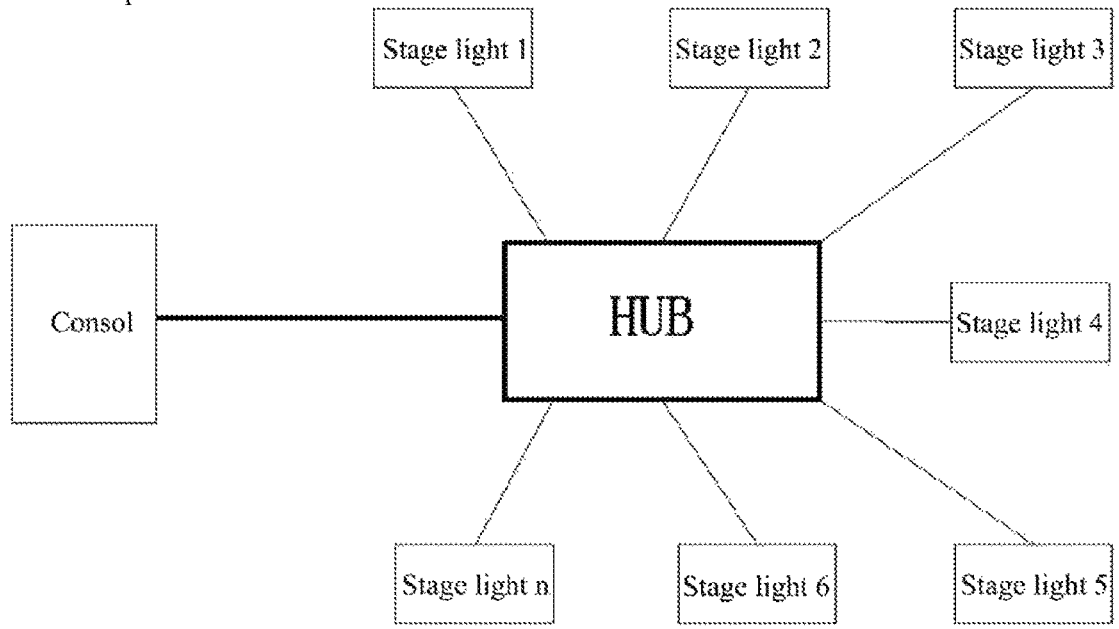
FIG. 2 is a block diagram of a star-type Ethernet network connection in the prior art.
Figure 3:
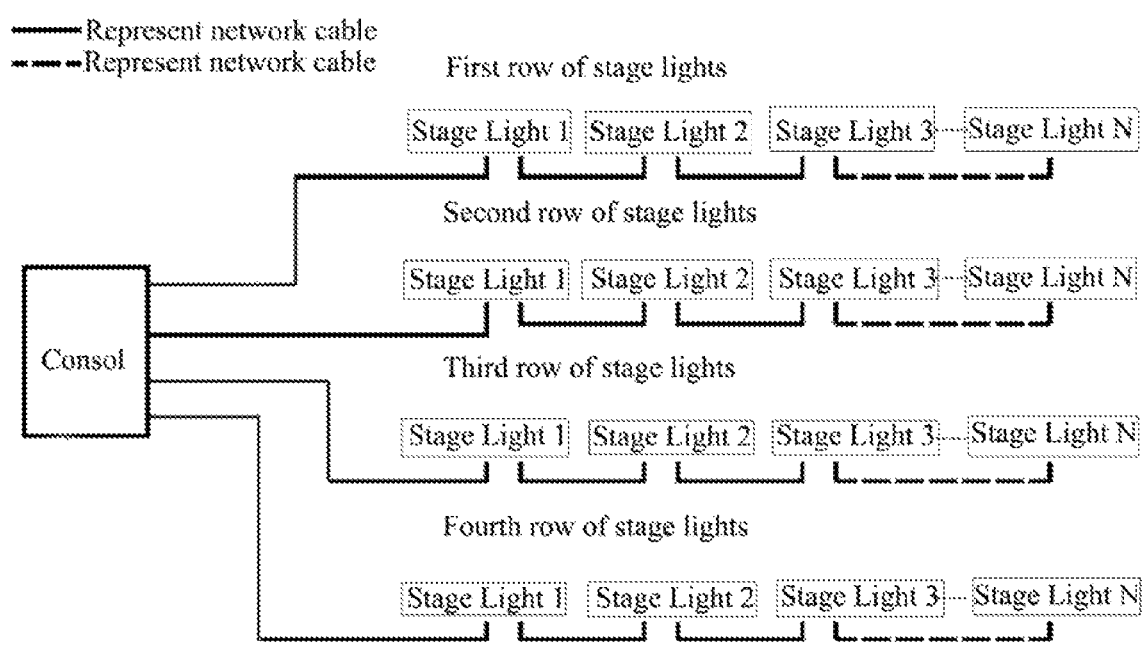
FIG. 3 is a block diagram of an ARTNET network connection for stage lights of the present invention.

As shown in FIG. 3, an Ethernet lighting control system for stage lights according to the present embodiment comprises an ARTNET console 401 and several rows of stage lights 402, wherein each row of stage lights 402 comprises several stage lights 402 successively connected in series; the ARTNET console 401 is respectively connected to a first stage light 402 in each row of stage lights 402 by means of a network cable; and adjacent stage lights 402 in each row of stage lights 402 are connected in sequence by means of a network cable.

Figure 4:
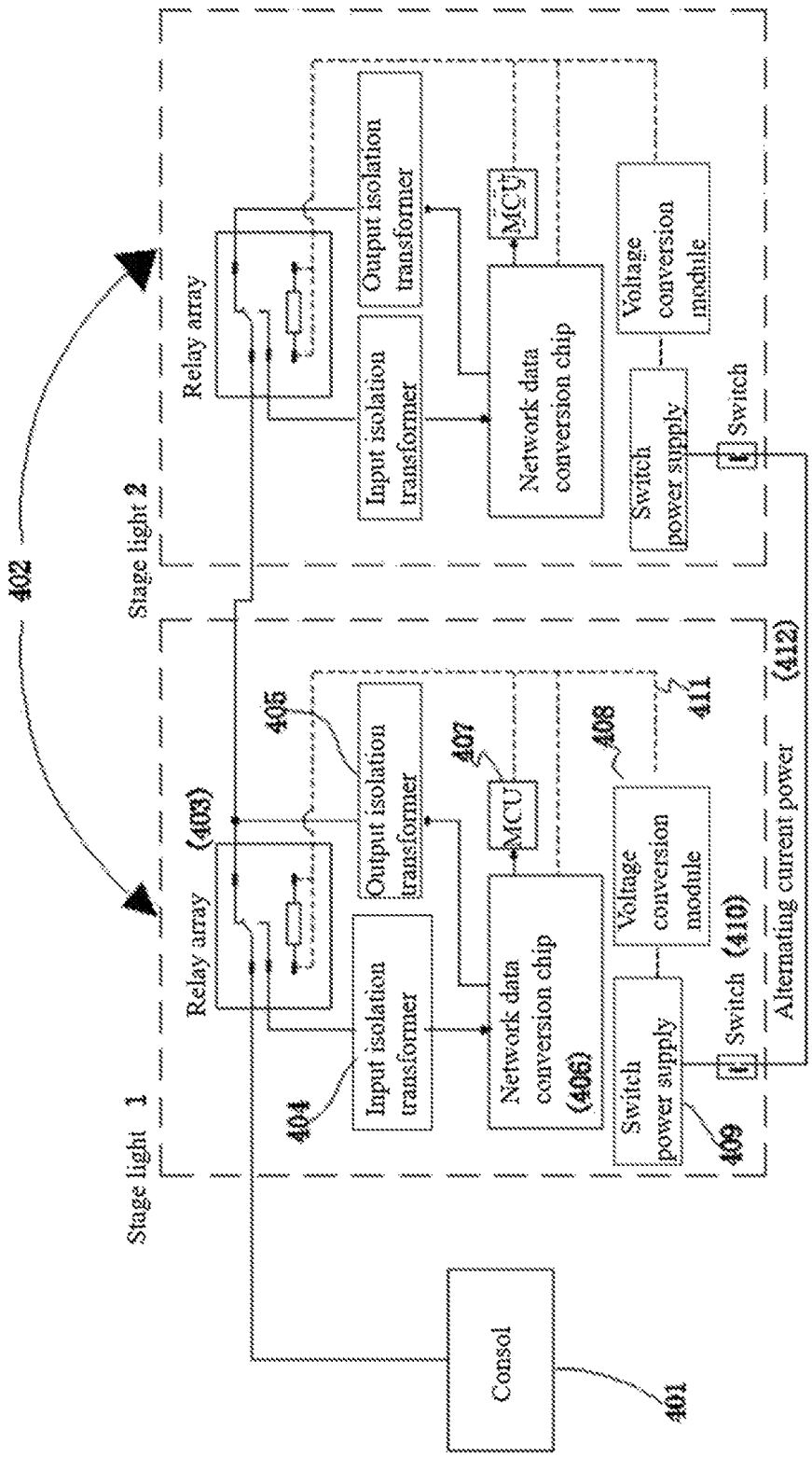
FIG. 4 is a principle diagram of the implementation of an ARTNET network for stage lights of the present invention.

As shown in FIG. 4, each stage light comprises the following functional components: a relay array 403, an input isolation transformer 404, an output isolation transformer 405, a network data conversion chip 406, an MCU 407, a voltage conversion module 408, a switch power supply 409, a switch 410, a direct current power supply 411, and an alternating current power supply 412.

The lighting control method applied to the Ethernet lighting control system for stage lights above comprises the following steps:

S1: the ARTNET console 401 sends a network signal and transmits same to a first stage light 402 in each row of stage lights by means of a network cable; and S2: the first stage light 402 in each row of stage lights switches and delivers the network signal sent by the ARTNET console 401 by means of the relay array 403, and when the stage light 402 where the relay array 403 is located operates normally, the relay array 403 will switch and deliver the network signal to the network data conversion chip 406, and the network data conversion chip 406 converts the network signal into network data, then sends the network data to the MCU 407, while the network data conversion chip 406 also sends the network data to a signal input end of the relay array 403 of the subsequent stage light 402 by means of the output isolation transformer 405; when the stage light where the relay array 403 is located has a fault, the relay array 403 will switch and deliver the network signal to the relay array 403 of the subsequent stage light 402, and the relay array 403 of the subsequent stage light 402 repeatedly performs step S2 until the last stage light 402 in each row of stage lights.

In the present embodiment, when the stage light 402 works normally, the network control signal sent by the ARTNET console 401 first reaches the signal input end of the relay array 403 of the first stage light 402 in each row of stage lights 402, and since the control enabling of the relay array 403 is decided by the output of the voltage conversion module 408, when an output voltage of the voltage conversion module 408 is normal, the relay array 403 will transmit the network control signal to the input isolation transformer 404, and then to the network data conversion chip 406, wherein the chip is a 3-port data conversion chip, which will send network data to the MCU 407 when receiving the network data, and also transmit the network data to the output isolation transformer 405. After receiving the network data packet sent from the network data conversion chip 406, the MCU 407 will perform analysis processing on the data and then control the operating of the stage light 402. The network signal sent by the network data conversion chip 406 to the output isolation transformer 405 will flow into a network receiving end of the subsequent stage light 402, and the subsequent stage light 402 will perform a corresponding control action after receiving the data.

When the stage light 402 has a fault, it is initially to first troubleshoot the cause. Generally, there are two reasons why the stage light 402 has a fault. One is that a power supply part has a fault, such as the switch power supply 409 and the voltage conversion module 408 being unable to work. If the control signal of the relay array 403 is lost, a network control portion of the relay array 403 will automatically switch the stage light 402 where it is located to a bypass state, and the network control signal sent from the console 401 or the preceding stage light 402 will be automatically transmitted to the subsequent stage light 402. Since the MCU 407 inside the faulty stage light 402 has not received the control signal, the working of the faulty stage light 402 cannot be controlled, such that the faulty stage light 402 can be quickly detected. The other reason is due to other faults than the power supply part. For this kind of fault, site management staff can turn off the switch 410, such that no direct current 411 of the faulty light is output, and the relay array 403 is then switched to a bypass state because there is no direct current 411.

The invention claimed is:

1. An Ethernet lighting control system for stage lights, comprising: an ARTNET console and several rows of stage lights,
    wherein each row of stage lights comprises several stage lights successively connected in series, each of the several stage lights being internally provided with a network switching unit for receiving, switching and delivering network signals; the ARTNET console is configured to connect to a network switching unit of a first stage light in each row of stage lights by means of a network cable respectively; adjacent stage lights in each row of stage lights are configured to connect in sequence by means of a network cable; and a network control signal sent by the ARTNET console is configured to be delivered to the network switching unit of the first stage light;
    wherein when the preceding stage light works normally, its network switching unit receives the network control signal and delivers same to an internal circuit of the stage light for processing and then transmits same to the network switching unit of the subsequent stage light,
    wherein when the preceding stage light has a fault, its network switching unit directly transmits the network control signal to the network switching unit of the subsequent stage light, and
    wherein the network control signal is used for controlling the working state of the stage lights, and the internal circuit provides the required power for the stage lights;
    wherein the network switching unit is provided in the stage light and is provided with a signal input end, a signal output end and a signal control end,
    wherein the signal input end of the network switching unit is connected to the preceding stage light adjacent to the stage light or the ARTNET console by means of the network cable; the signal output end thereof is connected to the internal circuit of the stage light or the network switching unit of the subsequent stage light by means of the network cable; and the signal control end thereof is connected to the internal circuit of the stage light where the network switching unit is located,
    wherein when the stage light works normally, the signal output end of the network switching unit thereof is in communication with the internal circuit of the stage light; and
    wherein when the stage light has a fault, the signal output end of the network switching unit thereof is in communication with the signal input end of the network switching unit of the subsequent stage light.

2. The Ethernet lighting control system for stage lights according to claim 1, wherein the network switching unit is a relay array.

3. The Ethernet lighting control system for stage lights according to claim 1, wherein the system further comprises a network data processing and control unit for performing data analysis and processing on the network control signal and executing the network control signal, and the network data processing and control unit is connected to the signal output end of the network switching unit.

4. The Ethernet lighting control system for stage lights according to claim 3, wherein the network data processing and control unit comprises a network data conversion chip and an MCU connected in sequence, the network data conversion chip is connected to the signal output end of the network switching unit, and the MCU is connected to the internal circuit of the stage light.

5. The Ethernet lighting control system for stage lights according to claim 4, wherein the system further comprises an input isolation transformer and an output isolation transformer, the input isolation transformer is provided between the signal output end of the network switching unit and the network data conversion chip, and the output isolation transformer is connected to the signal input end of the network switching unit of the subsequent stage light by means of a network cable.

6. The Ethernet lighting control system for stage lights according to claim 1, wherein the system further comprises a voltage conversion module, which is connected to the signal control end of the network switching unit.

7. The Ethernet lighting control system for stage lights according to claim 6, wherein the system further comprises a switch, a switch power supply and an alternating current power supply, the switch is respectively connected to the switch power supply and the alternating current power supply, the voltage conversion module is connected to the switch power supply, and the alternating current power supply is connected to the switch of the subsequent stage light.

8. An Ethernet lighting control method for stage lights, wherein an ARTNET console, network cables, several rows of stage lights, network switching units, an input isolation transformer, an output isolation transformer, a network data conversion chip, an MCU, a voltage conversion module and a switch are included, the method comprises the following lighting control steps of:

S1. the ARTNET console sends a network signal and transmits same to a first stage light in each row of stage lights by means of the network cable; and S2. the first stage light in each row of stage lights switches and delivers the network signal sent by the ARTNET console by means of the network switching unit, and when the stage light where the network switching unit is located operates normally, the network switching unit will switch and deliver the network signal to the network data conversion chip, then the network data conversion chip converts the network signal into network data, then sends the network data to the MCU, while the network data conversion chip also sends the network data to the signal input end of the network switching unit of the subsequent stage light by means of the output isolation transformer; when the stage light where the network switching unit is located has a fault, the network switching unit will switch and deliver the network signal to the network switching unit of the subsequent stage light, and the network switching unit of the subsequent stage light repeatedly performs step S2 until the last stage light in each row of stage lights.

* * * * *